United States Patent [19]

Vanderborgh et al.

[11] Patent Number: 4,973,530

[45] Date of Patent: Nov. 27, 1990

[54] FUEL CELL WATER TRANSPORT

[75] Inventors: Nicholas E. Vanderborgh; James C. Hedstrom, both of Los Alamos, N. Mex.

[73] Assignee: The United States of America as represented by the United States Department of Energy, Washington, D.C.

[21] Appl. No.: 454,608

[22] Filed: Dec. 21, 1989

[51] Int. Cl.⁵ .............................................. H01M 8/04
[52] U.S. Cl. ........................................ 429/13; 429/26; 429/30; 429/34
[58] Field of Search ..................... 429/13, 26, 30, 34

[56] References Cited

U.S. PATENT DOCUMENTS

| | | | |
|---|---|---|---|
| 3,418,168 | 12/1968 | Wentworth | 429/30 |
| 4,345,008 | 8/1982 | Breault | 429/26 |
| 4,530,886 | 7/1985 | Sederquist | 429/13 |
| 4,678,724 | 7/1987 | McElroy | 429/26 X |
| 4,686,159 | 8/1987 | Miyoshi | 429/26 X |
| 4,769,297 | 9/1988 | Reiser et al. | 429/17 |

Primary Examiner—Stephen J. Kalafut
Attorney, Agent, or Firm—Ray G. Wilson; Paul D. Gaetjens; William R. Moser

[57] ABSTRACT

The moisture content and temperature of hydrogen and oxygen gases is regulated throughout traverse of the gases in a fuel cell incorporating a solid polymer membrane. At least one of the gases traverses a first flow field adjacent the solid polymer membrane, where chemical reactions occur to generate an electrical current. A second flow field is located sequential with the first flow field and incorporates a membrane for effective water transport. A control fluid is then circulated adjacent the second membrane on the face opposite the fuel cell gas wherein moisture is either transported from the control fluid to humidify a fuel gas, e.g., hydrogen, or to the control fluid to prevent excess water buildup in the oxidizer gas, e.g., oxygen. Evaporation of water into the control gas and the control gas temperature act to control the fuel cell gas temperatures throughout the traverse of the fuel cell by the gases.

8 Claims, 6 Drawing Sheets

FUEL CELL WATER TRANSPORT

BACKGROUND OF INVENTION

This invention relates to fuel cells and, more particularly, to fuel cells incorporating polymeric ion exchange membranes for proton transport between electrodes. This invention is the result of a contract with the U.S. Department of Energy (Contract No. W-7405-ENG-36).

Fuel cells operate to convert chemical energy to electrical energy. In one embodiment, a fuel, hydrogen $H_2$, is oxidized at the anode to form protons $H^{30}$, $$H_2 = 2H^+ + 2e^+$$

and the protons traverse an ion exchange membrane to react with oxygen, $$O_2 + 4H^+ + 4e^- = 2H_2O.$$

One class of polymer electrolyte membrane (PEM) fuel cells uses a solid polymer membrane formed from an ion exchange polymer, such as polyperfluorosulfonic acid, e.g. Nafion, a DuPont Company product. Ion transport is along pathways of ionic networks established by the anionic (sulfonic acid anion) groups that exist within the polymer. Water is required around the ionic sites in the polymer to form conductive pathways for proton transport.

Such solid polymer membranes, however, become non-conductive when the polymer dries excessively and are not then useful for ion transport in fuel cells. The membranes are subject to moisture removal by evaporation due to heat generated in the chemical reaction and current transport (i.e., $i^2R$ type losses) and from electroosmotic transport from hydrogen water compounds, e.g. "hydronium ions" $H(H_2O)^+$, which transport water from the anode to the cathode. The electroosmotic "drag" is believed to transport one or two water molecules with each proton. Excess water is then available on the cathode side of the membrane from both the chemical reaction and the electroosmotic transport effects. There is some diffusion of excess water back from the cathode to the anode, but this is not always sufficient to prevent excessive membrane drying under high current operating conditions.

In one approach to maintaining adequate moisture in the membrane, an external humidifier is included in fuel cell system designs for introducing water as steam or a fine mist in the hydrogen gas fuel stream to the anode. However, as seen in FIG. 1, even with a saturated gas, a dehydrated gas is obtained after only a short traverse along a fuel cell channel. The back diffusion of water does provide some anode rehumidification, but even with substantial diffusivity this is inadequate to prevent excessive membrane drying at high current density values. The quantity of moisture carried by a saturated gas can only be increased by increasing the flow of gas, but this requires a recirculating gas system with recirculation pumps and some means of venting impurities which tend to build in the unused gas of the system. Liquid water could be introduced at the anode, but the liquid tends to flood the anode and restrict access of the fuel gas to reaction sites on the anode for current generation.

In conjunction with removal of moisture from the membrane and the final oxidation reaction, water accumulates on the cathode side of the membrane and must be removed promptly to maintain oxygen access to the reaction sites adjacent the membrane. An external recirculation system can also be provided for the oxygen to remove water and reaction heat from the oxygen stream prior to reintroducing the oxygen into the fuel cell. Such a system requires relatively pure reactant gases to minimize impurity buildup and the system must still be vented at intervals to remove trace impurities which accumulate.

In one attempt to resolve these problems, U.S. Pat. 4,769,297, issued Sept. 6, 1988, to Reiser et al., teaches the use of porous electrodes separated by a hydrophilic plate to transport excess water from a cathode flow field to an adjacent fuel cell anode flow field for moistening an adjacent solid polymer membrane. The hydrophilic plate adds volume to the active fuel cell region. Further, the porous plates enable oxygen transport to an adjacent hydrogen gas stream where the resulting hydrogen depletion reduces the overall cell operating efficiency. Evaporation of the water into the hydrogen gas stream is taught to cool the power generation section such that a separate cooling system is not required. However, a two-phase flow appears to be required over at least a portion of the hydrogen flow field with concomitant gas access restriction to reaction sites. There is no discussion about evenly distributing the moisture over the membrane flow field. Also, water transport is cumulative across the stacked fuel cells and the water content cannot be controlled to regulate the humidifying and temperature control effects of the water transport.

These and other problems of the prior art are addressed by the present invention and a PEM fuel cell is provided with internal flow fields that are dedicated to water transport for hydrogen humidification or oxygen dehumidification.

Accordingly, it an object of the present invention to provide a PEM fuel cell with an internal anode humidification flow field for maintaining a moist conductive membrane.

Another object of the invention is to provide a PEM fuel cell with an internal evaporation flow field surface for cooling the cell.

One other object of the invention is to provide a PEM fuel cell having an internal cathode flow field for water removal from the oxygen stream.

Yet another object of the invention is to provide a PEM fuel cell having a flow field sequential with a reaction flow field for use in regulating the humidification and cooling of the hydrogen and oxygen gas streams.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, the apparatus of this invention may comprise a fuel cell for generating electrical energy using hydrogen gas as a fuel and oxygen gas as an oxidizer with a polymeric ion exchange membrane for proton transport therebetween. A first flow field transports at least one of the hydrogen and oxygen gases adjacent the ion exchange membrane for chemical reactions generating an electrical current. A second flow field receives the gas sequential with the first flow field and has a water transport membrane for regulating the humidity and temperature of the gas within the first flow field. In one embodiment, water is provided adjacent one side of the membrane for humidifying a fuel gas. In another embodiment, a relatively dry fluid is provided adjacent the membrane for removing water from the fuel cell gas.

In another characterization of the invention, the moisture content in a gas that chemically reacts adjacent an ion exchange membrane for selected proton transport is regulated to maintain the moisture content uniformly in the membrane. The gas is repeatedly traversed across the fuel cell through a series of flow channels, where each channel has a first channel length for chemical reactions adjacent the proton transport membrane to generate a current in the fuel cell and a second channel length sequential with the first channel length and adjacent a water transport membrane for regulating the water content and controlling the temperature of the gas within the first channel length.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
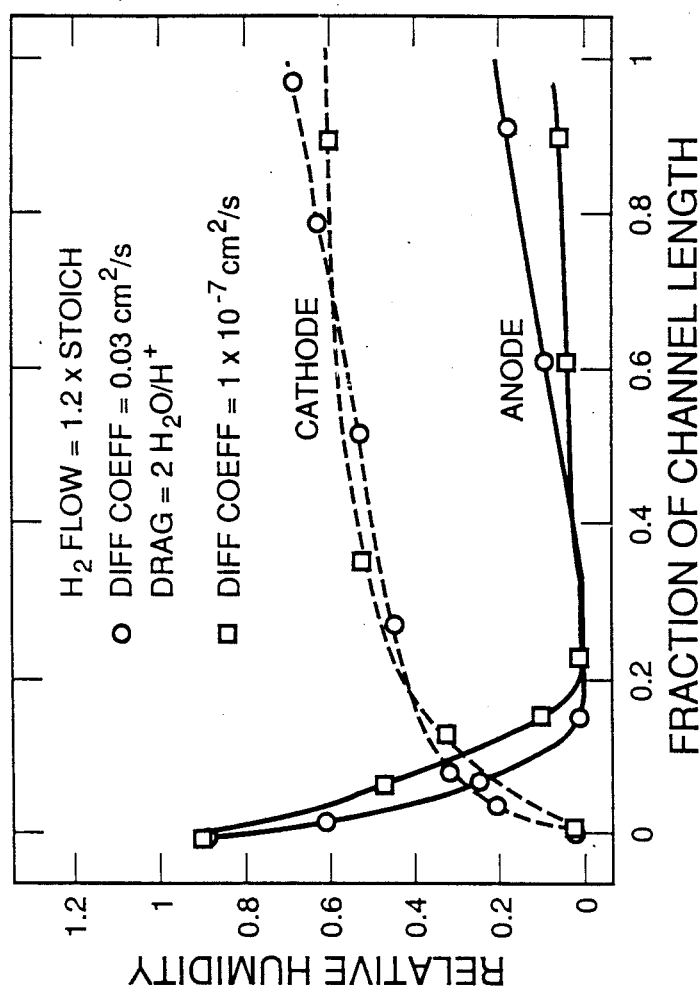
FIG. 1 is a graph illustrating $H_2$ and $O_2$ relative humidities along a channel length.

FIG. 1 illustrates a simulation showing gas phase relative humidity in the hydrogen gas (anode compartment) and oxygen gas (cathode compartment) during the gas traverse along the two flow channels within one cell of a conventional single $H_2$—$O_2$ fuel cell. In this example, the hydrogen gas is humidified prior to the fuel cell flow channel entrance to a near saturation condition and with a moderately excess hydrogen flow (1.2 time that needed for fuel cell operation). The gas is dehydrated within the anode flow channel due to the fact that hydrogen is consumed at rates slower than water removal. The hydrogen gas stream is substantially dehydrated after only one fourth of the flow channel has been traversed. Conversely, the incoming dry oxygen experiences substantial humidity increase along the channel length because of the water deposited from electroosmotic water transport across the fuel cell membrane and electroreduction of oxygen gas.

As shown in FIG. 1, the effect of increasing the value of the water diffusion coefficient from a value of $1 \times 10^{-7} cm^2/s$ to $3 \times 20^{-2} cm^2/s$ results in increased water transport rates that partially rehumidify the hydrogen stream. Different water diffusion coefficients can be realized by changing the membrane polymer type. Even with a greatly increased water diffusion rate, efficient drying occurs to lower the hydrogen gas phase relative humidity to below 10%. In these channel regions where dry gases persist, water moves from the membrane, creating zones of dry material with limited ability for rapid ionic transport. Dry zones generally exhibit inferior fuel cell performance.

It will be appreciated that the results depicted in FIG. 1 do not depend on the flow channel geometry selected during fabrication of the flow field, as long as the flow is held at a set value, such as the value of 1.2 times total consumption indicated above. Hydrogen gas containing a saturated moisture content is thoroughly dehydrated after the designated fraction of the hydrogen flow field has been traversed whether the flow occurs in series or parallel flow paths. The use of the term "hydrogen" includes any fuel cell gas mixture with appreciable hydrogen mole fraction (>25%), and the term "oxygen" includes any fuel cell gas mixture with appreciable oxygen mole fraction (>20%) as a constituent, such as air.

In accordance with the present invention, a separate water transport flow field, sequential with the power reaction flow field, transports moisture to or from the fuel cell gas mixture. The reacting gases repeatedly traverse a channel length in the reaction flow field and a channel length in the transport flow field. In this way the gas humidity and temperature is adjusted repeatedly and continuously to assure uniform gas composition and temperature across the entire power section within each single cell of a multiple fuel cell stack. The intent of the present invention is to facilitate obtaining the fuel cell conditions required for optimum performance: controlled temperature within both the anode and cathode flow compartments, adequate and continued humidification of the anode gas stream that flows through the anode compartment, and adequate and continued water removal from the cathode gas stream that flows through the cathode compartment.

The water transport flow field introduces additional membrane sections, which, like the reaction field membrane, are water permeable. Many polymeric materials exhibit water permeability, including hydrophilic membranes, such as the polyperfluorosulfonic membranes used as cation ion exchange membranes, and hydrophobic membranes, such as porous polytetrafluoroethylene (PTFE), which transports gaseous water (steam), but generally excludes liquid water transport. Either hydrophilic or hydrophobic membranes may have application for this purpose. In these water transport flow fields, water is transported across the membrane to regulate the moisture content in the adjacent fuel gas stream. Moreover, in the water transport flow fields, evaporation and condensation from the water transport absorb or generate thermal energy (heat). Temperature control is achieved in these separate flow fields by controlling water evaporation-condensation.

The present invention may utilize either one or two water transport fields, depending on design conditions.

Two distinct water transport flow fields will be separately described.

1. HYDROGEN HUMIDIFICATION FLOW FIELD

Water is transported across a membrane to control the moisture content within the adjacent fuel cell gas (anode flow stream). Control is achieved by passing the fuel cell gas over the face of a membrane section that is in contact with liquid water on the opposite face. The rate of water transport through a membrane is a function of membrane area, of temperature, of differential pressure, and of the gas-phase moisture content. For a given set of conditions, the fastest transport occurs into a gas-phase hydrogen stream with low water content.

It will also be appreciated that water evaporates from the membrane face exposed to the gas stream. Heat to effect this evaporation is extracted from the fluids adjacent the two membrane faces. Of particular importance for the humidification flow field, heat is extracted from the flowing gas stream, i.e., the gas is cooled during traverse through the humidification flow field. The gaseous mixture exits during each pass through the humidification flow field with increased moisture content and lower temperature than the gaseous mixture that enters for a pass through the flow field. Thus, the arrangement leads to a humidity and temperature control appropriate for gas use in the next fuel cell traverse through the reaction flow field, without external systems and without recirculating pumps. It is also apparent to one skilled in the fuel cell art that pure hydrogen gas or a hydrogen gas containing appreciable diluets, such as carbon dioxide, can be humidified.

2. WATER REMOVAL FLOW FIELD

Water is deposited in the cathode compartment due to two processes mentioned above: electroosmotic transport and electroreduction of oxygen (the desired fuel cell reaction). Water in the cathode compartment can exist either as steam (gaseous water) or liquid water, or as a mixture, so-called "two phase" flow. In some cases of fuel cell stack operation two phase flow is undesirable. For example, in space applications where the stack experiences no gravitational forces, liquid water can aggregate and block flow channels. Water is then removed either as a liquid or a gas in the water transport flow field. In a water removal field, a hydrophilic or hydrophobic membrane is used to separate the flowing mixture within the cathode compartment from another flowing fluid stream. This fluid stream may be air or some other fluid for water removal and is moved across the opposite membrane face. This second fluid stream is called "cooling air" to differentiate this fluid stream from the oxygen-containing gas stream fed into the primary cathode compartment. The cooling air stream may be introduced at a different pressure from the air flowing into the primary cathode compartment. Generally, the cooling air stream will be at a lower pressure than the gas within the primary cathode compartment.

Water is carried in the cathode gas flow, away from the reaction flow field, where the water was generated, and into the water transport field. Within that flow field water moves from the cathode gas flow, either as droplets carried along as part of the two-phase water flow or as water condensed from the cathode gas flow, into the membrane. Water enters the membrane as the result of two forces: the membrane is cooler than the entering gas, or the membrane is hydrophilic, resulting in water flow through capillary forces. A limited quantity of air may also cross that membrane. If nitrogen crosses the membrane at higher rates than oxygen, the oxygen concentration will increase during traverse of the gas across the cathode compartment. Thus, water is removed from the cathode gas flow. The cathode gas flow is cooled by traverse through the water transport flow field. Cooling results from the fact that heat flows from the cathode gas flow through the thin membrane sheet and into the cooling gas flow.

In systems driven by oxygen under operational scenarios where air is not available (e.g., space based), another fluid might be used for water removal. A fluid that forms miscible solutions with water flowing through similar passages also serves to remove water from the cathode gas passages. Therefore it should be understood that the designs depicting air in this passage may as well be depicted as designs using another working fluid for active, continuous water removal.

Figure 2A:
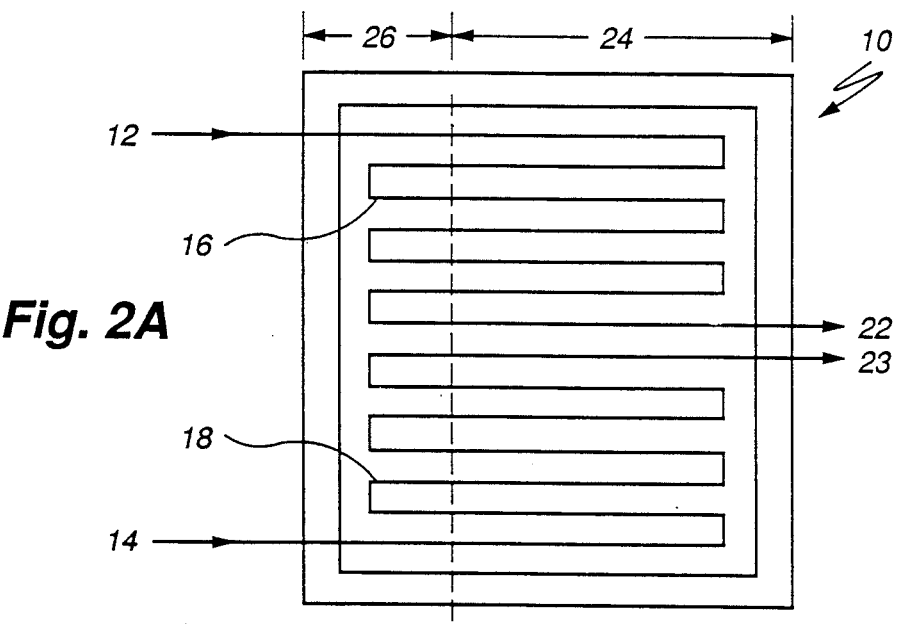
FIGS. 2A and 2B are plan view schematics of a flow field distribution according to one embodiment of the invention.
Figure 2B:
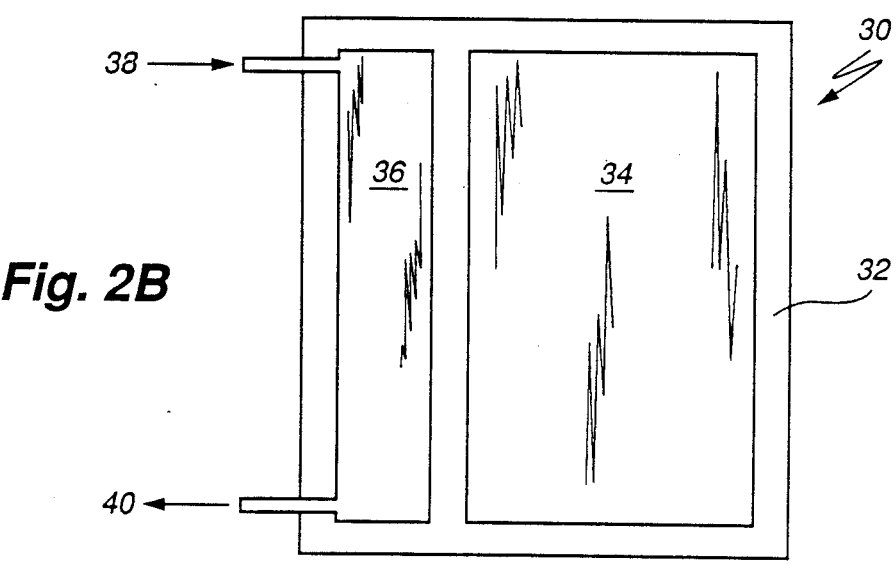

FIGS. 2A and 2B illustrate in plan view one arrangement of flow fields according to the present invention. Flow plate 10 is a serpentine flow field plate for repeatedly passing a fuel cell gas from a reactant flow field 24 to a water transport field 26. At least one continuous serpentine gas flow channel is needed to flow the gas through the flow field. FIG. 2A illustrates an arrangement with two serpentine gas flow fields 16 and 18. The use of two or more serpentine gas flow channels may be required to maintain acceptable pressure drops at the desired flow rates. Gas enters through ports 12 and 14. traverses flow channels 16 and 18 and exits through ports 22 and 23, respectively. Additional serpentine flow channels could be included, as needed.

FIG. 2B depicts membrane plate 30 with support frame 32 for holding and separating ion exchange membrane 34 and water transport membrane 36. These two membranes may be fabricated of the same polymer formulation or may be two separate polymer formulations. Membrane plate 30 covers flow plate 10 with proton exchange membrane 34 defining a power generation field 24 for the fuel cell electrochemical reactions and current generation, and water transport membrane 36 defining a transport field 26 for regulating the moisture content and temperature of the gas contacting membrane 36. A fluid is provided to inlet 38 and removed at outlet 40 opposite fuel cell water transport field 26 effective for regulating the moisture content in the gas in field 26. It is understood that certain seals and gaskets are conventionally required to preclude fluids from flowing uncontrolled between the several zones but are not shown for purposes of clarity.

Thus, for hydrogen gas traversing serpentine channels 16 and 18, water is added to the gas to maintain the relative humidity as water is removed by the processes of electroosmotic water transport and condensation in reaction zone 34. The fluid on the opposite face of membrane 36 is preferably liquid water. Relative lengths of each traverse of reaction field 24 and water transport field 26 by flow channels 16 and 18 are selected to replace the moisture removed during traverse through reaction field 24. A relative humidity of at least 10% in the hydrogen gas is required to maintain the face of membrane 34 in a "wet" and ionically conductive condition.

Hydrogen humidification also provides continuous cooling of the fuel cell single cell. Cooling is required to remove heat that results from two causes: (1.) heat is generated during the fuel cell power generation because the electrical conversion efficiency is less than 1.00, and 2.) some small quantity of hydrogen crosses the membrane and then chemically combusts with oxygen. During this chemical combustion no useful electrical energy is generated. Humidified hydrogen begins a traverse across reaction flow field 24 and is heated and dried during the traverse. The dried, hot gas enters water transport flow field 26 for humidification. Water is transported across membrane 36 to the membrane face adjacent the dry gas in flow field 26, where the water evaporates in the gas stream, removing heat from the flowing hydrogen-containing gas as well as from the liquid water on the opposite face of the membrane 36. Gas-phase cooling is obtained during each pass of the hydrogen-containing gas through water transport field 26.

Figure 3:
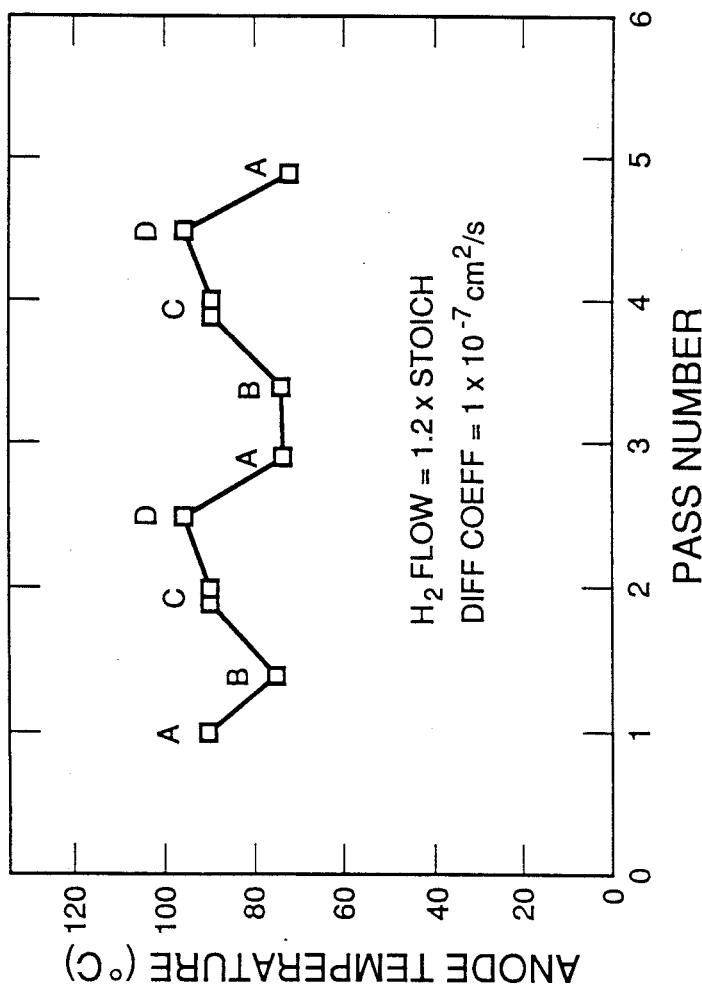
FIG. 3 is a graph illustrating a simulation of fuel cell gas temperature during repeated traverses with a fuel cell similar to the embodiments shown in FIGS. 2A and 2B.

FIG. 3 shows the results of a simulation of the temperature regulation from a flow field arrangement similar to the flow field arrangement of FIGS. 2A and 2B. The letter A depicts the entrance and flow reversal area in the humidification flow field, B depicts the transition to the reaction flow field, C depicts the area of flow reversal through the reaction flow field, and D depicts the transition to the humidification flow field. Thus, humidification field traverse AB and reaction field traverse BC represent one pass through a fuel cell and traverses CD and DA represent one pass through the fuel cell. As shown in FIG. 3, hydrogen gas initially enters the cell for traverse AB through the humidification field where water evaporation into the gas removes heat from the gas and cools the gas during traverse AB. The cooled and humidified gas then enters the reaction field and is heated during traverse BC. The reaction field traverse is continued on traverse CD. Thereafter the heated gas enters the humidification field for traverse DA where the gas is again cooled and humidified. Thus, the hydrogen gas is repeatedly heated and cooled wherein an operating temperature below 100° C. is maintained.

Referring again to FIGS. 2A and 2B, serpentine flow field plate 10 and membrane plate 30 can also be used to regulate the water in an oxygen gas stream traversing flow channels 16 and 18. As discussed above, the water content of the oxygen-containing gas stream increases as the gas traverses across reaction field 24. Thus, water must be removed from the oxygen gas stream. Water is transported from the oxygen-containing gas stream across membrane 36 to a fluid on the opposite face, such as a dry gas. Hydrogen could be input as a dry gas and humidified prior to input to the anode section of the fuel cell, or some other gas, such as air, or another fluid, can be selected. The water removal fluid is provided at a selected temperature, generally lower than the oxygen-containing gas, so that water condenses from the oxygen-containing gas onto membrane face 36 and is then transported across membrane 36 for evaporation into the water removal fluid. During condensation onto membrane 36, heat is released because of the condensation process; an equal quantity of heat is consumed because of the evaporation of that water into the fluid flowing across the opposite membrane face. This condensation-evaporation process results in no net change in temperature. Rather, heat is deposited in the cooler flowing fluid and heat is removed from the device so that the oxygen-containing gas returning to reaction field 24 is both drier and cooler than the gas that enters water transport field 26.

Figure 4A:
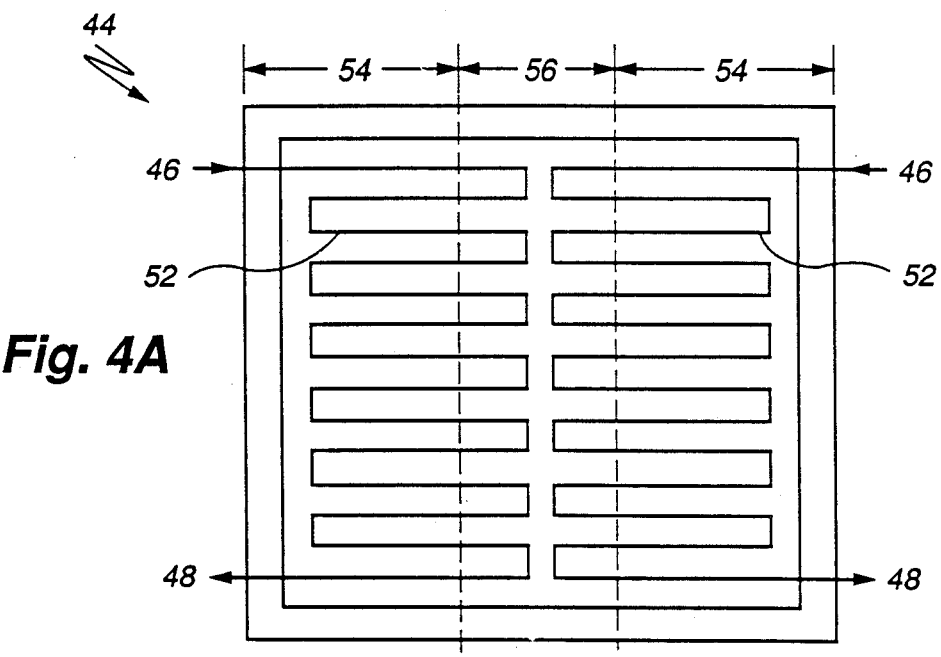
FIGS. 4A and 4B are plan view schematics of a flow field distribution according to a second embodiment of the invention.
Figure 4B:
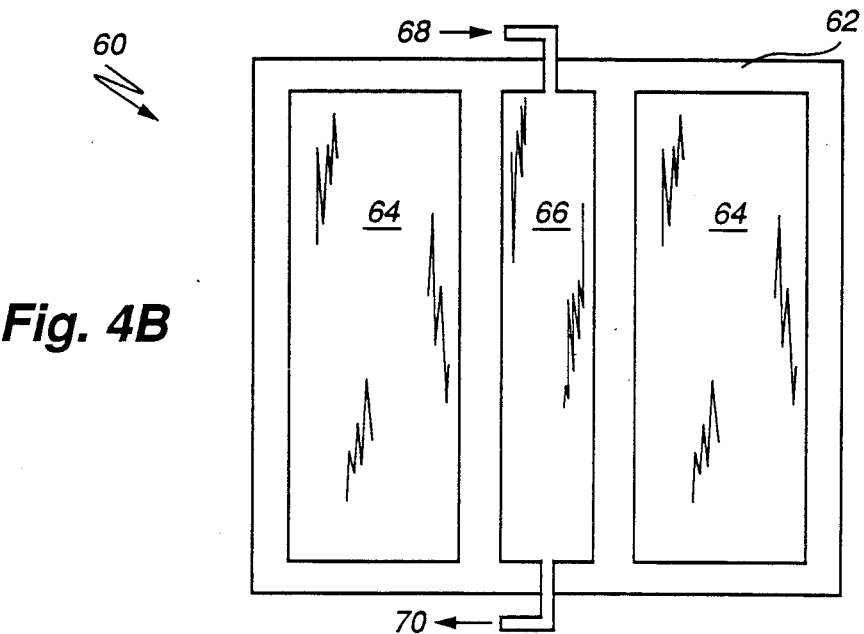

Another embodiment of the present invention is shown in FIGS. 4A and 4B. Flow plate 44 includes two serpentine flow channels 52 with gas inlets 46 and gas outlets 48 for flowing gas repeatedly through reaction zones 54 (electrochemical section) and intermediate water transport zone 56. The plurality of serpentine flow channels 52 enables a sufficient number of reaction zone traverses to be accomplished without an undesirable pressure drop. Membrane plate 60 includes support frame 62 with ion exchange membranes 64 and water transport membrane 66 separated from ion exchange membranes 64. A fluid is introduced at inlet 68 and removed at outlet 70 for regulating the moisture content and temperature of the gas in serpentine channels 52. As discussed above, the system can be used for hydrogen humidification or for oxygen dehumidification.

The arrangement of the serpentine flow channels and ion exchange membranes forming separate flow fields for the electrochemical reactions generating electrical current within the fuel cell and for water transport to regulate the moisture content of the fuel cell gases is clearly not limited to the above two embodiments, and no such limitation is intended herein. Any number of serpentine paths can be provided to maintain an acceptable pressure drop. A water transport flow field should be provided adjacent the reaction field at locations effective to maintain the humidity of hydrogen gas adjacent the face of the polymer ion exchange membrane, or to prevent the accumulation of excessive water in the oxygen gas stream. Temperature regulation is obtained through the flow field geometries to provide the desired cooling prior to the reintroduction of the gas stream into the electrochemical reaction flow field.

Figure 5:
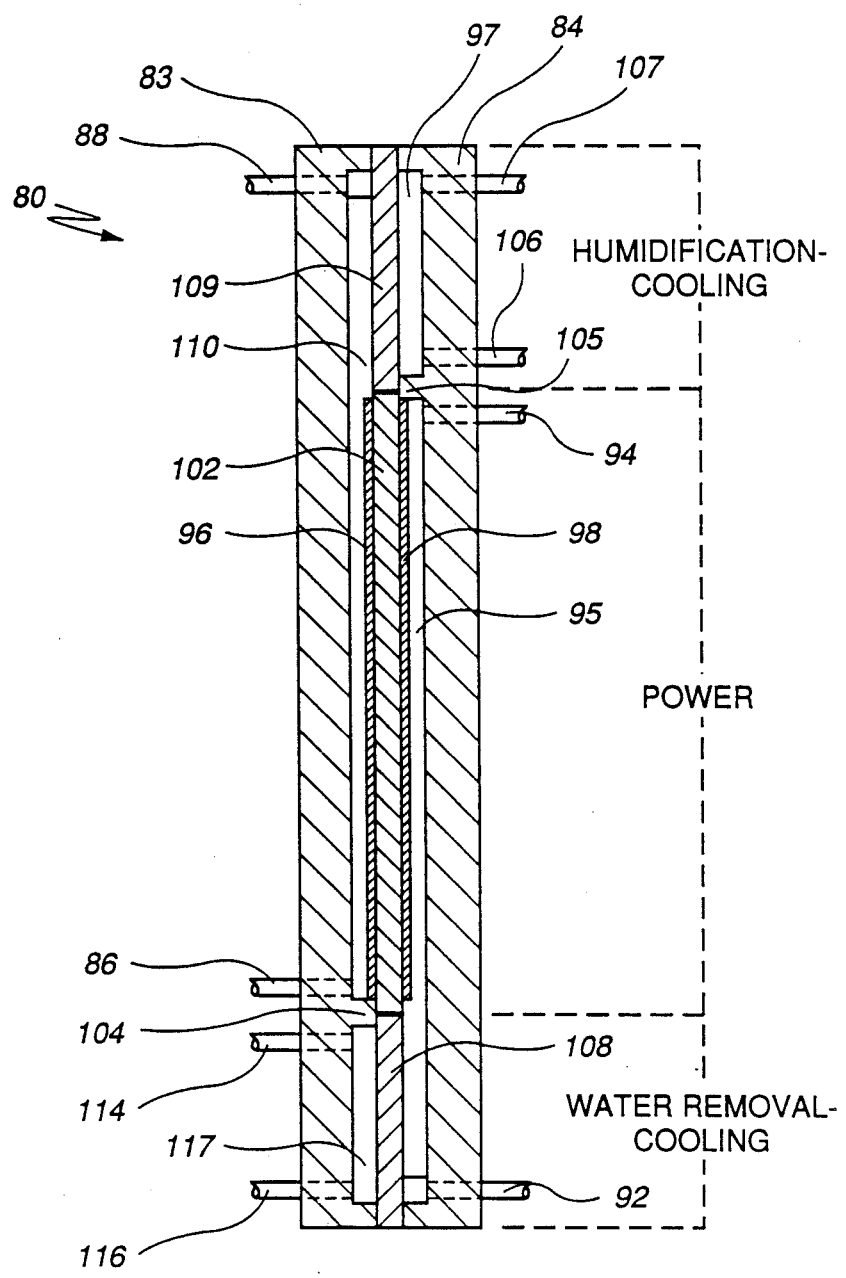
FIG. 5 is a cross-section view illustrating an embodiment of a fuel cell with both anode and cathode moisture control.

A fuel cell assembly 80 incorporating features of both hydrogen humidification and oxygen stream water removal is shown in cross-section in FIG. 5. Anode flow field plate 83 defines serpentine flow channels 110 for hydrogen-containing gas flow adjacent anode reaction surface 96. Inlet 86 and outlet 88 provide gas flow through flow field plate 83. Cathode flow plate 84 defines serpentine flow channels 95 for oxygen-containing gas flow adjacent cathode reaction surface 98. Inlet 92 and outlet 94 provide gas flow through flow field plate 84. Ion exchange polymer membrane 102 incorporates an active catalytic layer on each face to define anode reaction surface 96 and cathode reaction surface 98 for proton transport therebetween.

Flow field dividers 104 and 105 separate the fuel cell power section from the secondary water transport flow fields, one for humidification of the anode gaseous mixture and another for drying the cathode gaseous mixture. Liquid water flows into the humidification/cooling volume 97 (water side) through port 106 and exits through port 107. The water traverses one side of the membrane section utilized for humidification/cooling while serpentine flow path 110 traverses the opposite face of the membrane section. As hereinabove described, the gas flow entering port 86 and exiting port 88 repeatedly traverses the serpentine flow channels 110 where the gas is sequentially heated and dried and then cooled and humidified. Humidified and cooled gas is returned across reaction surface 96 where water is transported across ion exchange membrane 102 to cathode gas in flow channels 95. The hydrogen gas traverses across reaction surface 96 and water transport membrane 109 to sustain appropriate moisture content in membrane 102.

An oxygen-containing gas stream in channels 95 carries product moisture from cathode reaction surface 98 during a traverse of surface 98. This moisture is then transported through membrane 108 within the water removal/cooling flow field to water transport volume 117 for removal from fuel cell 80. A relatively dry gas or other fluid is input to volume 117 through inlet 116. Moisture transported by the membrane evaporates into volume 117 and then exits fuel cell 80 through exit 114, carrying product water and some fraction of the heat generated by fuel cell 80 as a byproduct of the fuel cell electrochemical reaction. Therefore, the fluids in volumes 97 and 117 also provide thermal regulation for fuel cell 80. Flow ports 06 and 116 regulate water flow adjacent water transport membranes 109 and 108. Hydrogen gas flows along channels 10 where the hydrogen is humidified as water is evaporated into the hydrogen as the hydrogen repeatedly traverses the fuel cell channels until the remaining, unreacted hydrogen is exhausted through outlet port 88. The process of water evaporation cools the hydrogen stream where the hydrogen gas that is returned to the electrochemical reaction surface 96 is higher in moisture content and cooler than the gas that exited reaction surface 96 from a previous traverse.

Oxygen gas or oxygen-containing gas in channels 95 incorporates water resulting from the reaction occurring at cathode surface 98 as well as water that is transported across membrane 102 and is heated from the heat produced as part of the reaction on cathode surface 98. Other heating results from small, parasitic leakages that result in hydrogen-oxygen combustion with no useful electrical energy production. Ports 116 and 114 regulate the flow of fluid into volume 117 to remove water from the oxygen-containing gas stream and to provide cooling for the oxygen-containing stream that repeatedly traverses reacting surface 98. The oxygen-containing gas stream repeatedly traverses water removal/cooling section membrane face 108 and water is removed from the oxygen-containing gas for transport to the fluid in volume 117. A suitable fluid flowing in volume 117 is a dry gas or some alternative fluid for water removal. The oxygen that exits the water removal/cooling section for another traverse across the electrochemical reaction surface 98 is drier and cooler than the oxygen-containing gas mixture entering from reaction surface 98.

Figure 6C:
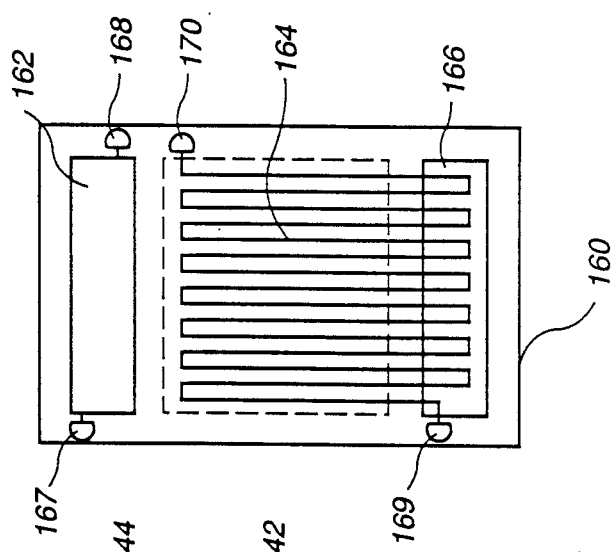
FIGS. 6A, 6B, and 6C are plan schematic views of fuel cell single cell components with both anode and cathode moisture and thermal control.
Figure 6B:
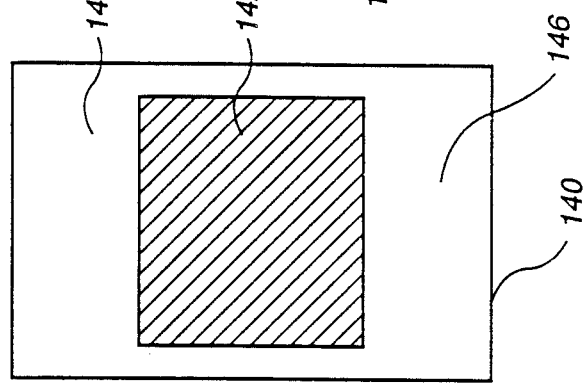
Figure 6A:
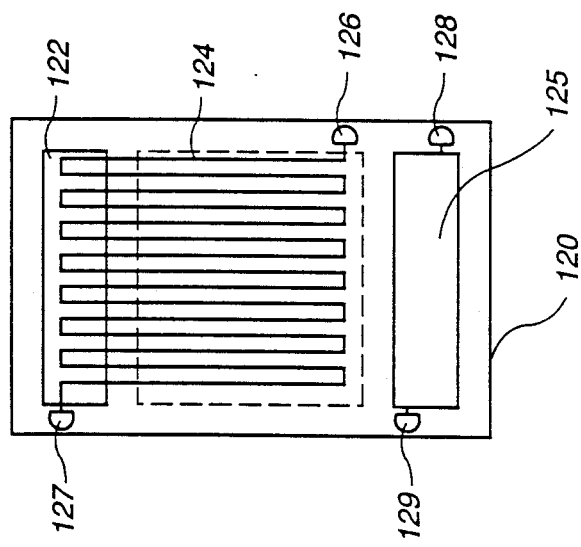

The above described embodiments depict a single fuel cell, containing both anode and cathode compartments and one or two auxiliary water control/temperature control channels. Fuel cell devices are typically assembled in series so that higher voltages are obtained For many applications 10 or more cells may be assembled. Such fuel cell assemblies are termed stacks of fuel cells. FIGS. 6A, 6B, and 6C depict one embodiment of a single cell which would be repeatedly formed to assemble a fuel cell stack.

In plan view, three components are illustrated: (1.) anode flow field 120; 2.) membrane and electrode assembly 140: and (3.) cathode flow field 160. It will be appreciated that anode flow plate 120 contains a matching pattern for cathode flow field 160 on the opposite side of membrane 140. It will also be appreciated that the assembly is formed by placing membrane and electrode assembly 140 onto either flow field 120 or 160, and then placing the remaining flow field on membrane 140 so that flow field plates 120 and 160 face each other in final assembly.

Membrane and electrode assembly 140 contains membrane sections for three purposes: (1.) an active electrochemical reaction area 142: (2.) anode humidification and cell cooling 144; and (3.) water removal and cell cooling 146. Anode plate 120 incorporates features in registration with membrane and electrode assembly 140, where plate 120 is partitioned into electrochemical reaction region 124. humidification region 122, and water removal region 125. A single serpentine flow path is shown to repeatedly traverse electrochemical region 124 and humidification and cooling region 122. Anode plate 120 is provided with ports that feed a hydrogen-containing gas stream into port 127 through the humidification section 122 and electrochemical reaction section 124, and through exit port 126. Plate 120 also contains ports for water removal/cooling fluid flow through inlet 29 and exit 128.

Cathode flow plate 160 also incorporates active electrochemical area 164, water compartment 162 for anode humidification, and water removal section 166. Oxygen-containing gas enters through port 169 and flows repeatedly across electrochemical area 164, water removal area 166, and exits through port 170. Liquid water for anode humidification enters port 167, flows across humidification section 162, and exits through port 127, Although these plan views in FIGS. 6A and 6B depict a single serpentine flow field design, obviously one or more such serpentine flow fields may be included for optimum pressure distribution in the flow channels. It will also be understood that flow plates 120 and 160 are conventionally constructed using electrically conductive materials, such as known corrosion resistant metals, graphites with low gas permeability, and composites, especially mixtures of polymeric binders and conducting materials, especially graphites.

Flow plates 120 and 160, shown in FIG. 6A and 6C, incorporate ports 126, 127. 128, 129, 167. 168. 169, 170 that are cut through the plates. When four or more of these plates are stacked, one on another, the various flow channels align to form flow plena. It is readily apparent that holes must be cut in marginal areas of the polymeric material comprising membrane 140 to permit flow through the plena. These holes are not depicted in FIG. 6B for a single cell, but are included when a fuel cell stack is assembled. These plena permit the influx and egress of an oxygen-containing gas, a hydrogen-containing gas, a fluid such as liquid water suitable for humidification of the anode compartments and for temperature control, and a fluid such as air suitable for removal of product water and for temperature control. It is readily apparent that the pressure and composition of the various fluids need not be the same.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fuel cell using hydrogen gas as a fuel and oxygen gas as an oxidizer and a solid polymer membrane for proton transport therebetween, comprising:
   a first flow field for transporting at least one of said hydrogen and oxygen gases adjacent said proton transport membrane for chemical reactions generating electrical current; and
   a second flow field for receiving said at least one of said gases sequential with said first flow field and having a water transport membrane for regulating the humidity of said gas within said first flow field.

2. Apparatus according to claim 1, further including a gas flow channel repeatedly traversing said first and second flow fields, each traverse of said flow channel having a first channel length in said first flow field and a second channel length in said second flow field.

3. Apparatus according to claim 2, wherein said second channel length is effective to humidify said hydrogen gas for moisturizing said proton transport membrane effective to maintain ionic conductivity.

4. Apparatus according to claim 2, where said second channel length is effective to remove excess water from said oxygen gas.

5. Apparatus according to claim I, further including a fluid flow channel for maintaining a fluid flow adjacent said water transport membrane opposite said fuel cell gas effective to evaporate water from said water transport membrane for cooling said fuel cell gas.

6. A method for regulating the moisture content in a gas which chemically reacts adjacent a solid polymer membrane for proton transport in a fuel cell, comprising the steps of:
   repeatedly traversing a flow of said gas through a series of flow channels, each flow channel having a first channel length for chemical reactions adjacent said proton transport membrane to generate a current in said fuel cell and a second channel length sequential with said first channel length and adjacent a water transport membrane for regulating the water content of said gas within said first channel length.

7. A method according to claim 6, wherein regulating said gas water content comprises the step of providing a fluid with excess water adjacent said water transport membrane opposite a flow of hydrogen fuel gas to humidify said hydrogen to maintain moisture in said proton transport membrane for ionic conductivity.

8. A method according to claim 6, wherein regulating said gas water content comprises the step of providing a relatively dry gas adjacent said water transport membrane opposite a flow of oxygen for water removal from said oxygen to said relatively dry gas.

* * * * *